United States Patent [19]

Mann et al.

[11] 4,009,037

[45] Feb. 22, 1977

[54] COATED SYNTHETIC FILM MATERIALS

[75] Inventors: David Roderick Mann, Colchester; James Albert Barker, Ipswich, both of England

[73] Assignee: Imperial Chemical Industries Limited, London, England

[22] Filed: Jan. 21, 1974

[21] Appl. No.: 435,175

[30] Foreign Application Priority Data

Feb. 1, 1973 United Kingdom ............... 5089/73

[52] U.S. Cl. ............................... 96/87 R; 96/84 R; 427/40; 427/307; 427/316; 427/322; 427/414
[51] Int. Cl.² ...................... G03C 1/78; G03C 1/96
[58] Field of Search .......... 117/34, 93.1 CD, 93.31; 96/87 R; 427/307, 316, 322, 414, 40

[56] References Cited

UNITED STATES PATENTS

| | | | |
|---|---|---|---|
| 3,415,683 | 12/1968 | Coffman et al. | 427/40 |
| 3,475,193 | 10/1969 | Takenaka et al. | 117/34 |
| 3,549,406 | 12/1970 | Ambush | 427/40 |
| 3,697,305 | 10/1972 | Tatsuta | 117/34 |
| 3,705,808 | 12/1972 | Kasugai et al. | 117/34 |
| 3,837,886 | 9/1974 | Tatsuta et al. | 117/34 |

*Primary Examiner*—Ronald H. Smith
*Assistant Examiner*—Dennis C. Konopacki
*Attorney, Agent, or Firm*—Cushman, Darby & Cushman

[57] ABSTRACT

Improving the adhesion of a gelatin coating to a styrene homopolymer or copolymer film by solvent treating and corona discharge treating the film prior to coating with a gelatin layer in the production of a coated photobase.

10 Claims, No Drawings

COATED SYNTHETIC FILM MATERIALS

The present invention relates to coated synthetic film materials, and particularly to films of a styrene polymer coated with a gelatin layer for use in the photographic art.

BACKGROUND AND SUMMARY OF THE INVENTION

German Applications 2 060 382 and 2 123 785 relate to opaque white photographic printing materials which are made by roughening the surface of a polystyrene film, for instance by treating the film with a solvent and then a non-solvent for the polystyrene, discharge treating the film and then coating it with a gelatin-containing layer.

This invention is concerned with the pretreatment of a film surface to develop strong adhesion between the film and a subsequently applied gelatin-containing layer.

According to this invention a process for producing a light transmitting coated synthetic film material comprises pretreating the surface of a styrene homopolymer or copolymer film and coating said surface with a gelatin-containing layer, the pretreating step consisting of treating the film surface with a solvent for the film and corona discharge treating the solvent treated surface. In such a process the film is not treated with a non-solvent after treatment with the solvent and therefore opacification and whitening of the film does not occur and it has been found that the adhesion of the gelatin-containing layer to the film surface is satisfactory. The coated film product is therefore light transmitting and may be used as a carrier for photographic images produced within the gelatin-containing layer or in other layers applied thereto. Such products can be used, for example, for microfilming.

The invention therefore also relates to the coated film produced by the above process and to photographic films produced from them by the application of a light sensitive composition.

One or both of the film surfaces may be treated. Thus the treatment may be used to develop adhesion to a light sensitive layer applied to one surface and to an anti-halation layer applied to the other surface.

The film may be made from a homopolymer or copolymer of styrene. When a copolymer film is used the copolymer may contain from 1 to 50% by weight of one or more other comonomers with styrene, the comonomers generally being added to reduce the brittleness and improve the impact strength of the film. Suitable comonomers include butadiene and acrylonitrile. Preferably the film is a copolymer of 95% by weight styrene and 5% by weight butadiene. The film is also preferably biaxially oriented by any suitable process known in the art.

The treatment with a solvent is effected to make the film surface porous to the gelatin-containing layer. Any suitable solvent or mixture of solvents for the styrene homopolymer or copolymer, which may optionally be employed in an acceptable organic diluent, may be used for the treatment; non-solvents must be avoided since they cause the film to opacify and such films are not suitable for photographic film bases. Furthermore some solvents produce micro-cracks in the film surface and such solvents should preferably be avoided or used in admixture with another acceptable solvent which has a diluting effect upon their tendency to initiate microcracking. Suitable solvents include methyl ethyl ketone, toluene, 1,1,1-trichloroethane, acetone, methylene chloride, methyl acetate and ethyl acetate.

The solvent or mixture of solvents can be applied by any suitable known coating technique such as dip coating or roller coating. The actual coating process and the extent to which the film is allowed to be subjected to the solvent must be controlled to prevent destruction of the film during the solvent treatment. Thus the treatment is intended to modify the surface layer of the film. A wet coat weight of solvent or solvent mixture in the region of 100 mg/dm2 is generally adequate for this surface treatment. Contact with the solvent for from 0.1 to 10.0 seconds is generally sufficient to develop adequate porosity. A treatment of 0.5 to 4.0 seconds is preferred. The solvent on the film surface should be dried before corona discharge treatment.

After treatment with the solvent or solvent mixture the film is subjected to corona discharge treatment using a high frequency, high voltage generator, preferably having a power output of from 1 to 20 kw. at a potential of 1 to 100 kv. Discharge is conveniently accomplished by passing the film over a dielectric support roller at the discharge station at a linear speed preferably of 1.0 to 100 m per minute. The discharge electrodes may be positioned 0.1 to 10.0 mm from the moving film surface. The corona treatment results in a wetting test value exceeding 56 dynes/cm when measured by the Union Carbide Standard Wetting Test (WC 81-3/1964) with Formamide/'Cellosolve,' whereas untreated polystyrene film gives a value in the region of 34 dynes/cm. In this test liquid mixtures having a range of surface tensions, are made up using various concentrates of formamide in 'Cellosolve' (2-ethoxy ethanol) and brushed on to the surface to be examined. The wetting test value is the surface tension of the liquid mixture having the highest surface tension which does not contract into droplets within two seconds after application on to the surface.

It has been found that the use of the solvent or solvent mixture alone or corona discharge treatment alone does not result in good adhesion to the gelatin-containing layer and any other overlying layers. The solvent or solvent mixture treatment makes the surface layer of the film more porous and enables the gelatin-containing layer to actually penetrate into the film to a greater depth than when the film is not treated with a solvent. This can be determined by microscopic examination of suitably treated and coated films. Thus the penetration results in some "mechanical keying" of the gelatin-containing layer to the film but it has been found that the actual improvement in adhesion resulting from the solvent treatment alone is only slight.

Corona discharge treatment leads to an improvement in the wetting properties of the surface treated. However, the wetting test value is the same after discharge treatment, in excess of 56 dynes/cm, for solvent treated and untreated film and it has been found that the adhesion of the gelatin-containing layer to discharge treated film but non-solvent treated film is poor. Thus the effects of "mechanical keying" and improved wetting, resulting from solvent and discharge treatment respectively, are not adequate to develop adequate adhesion separately. However, the combination of both treatments surprisingly results in good adhesion.

After the corona discharge treatment, the film is coated with the gelatin-containing layer. Preferably this layer consists of a gelatin subbing layer which is intended to anchor an overlying layer, such as a light sensitive emulsion or an anti-halation layer to the film surface, but if desired the gelatin subbing layer may be omitted and the light sensitive or anti-halation layer can be applied, as the gelatin-containing layer, direct to the solvent and discharge treated film. The adhesion of such a layer to the film is, however, less than when a gelatin subbing layer is employed but is nevertheless adequate for some uses.

When a gelatin subbing layer is applied as the gelatin-containing layer, the subbing composition can be applied by any known method such as dip coating, roller coating or slot coating, either from an aqueous or organic solution. According to this invention such a subbing layer requires a short drying cycle to develop satisfactory adhesion to the film. Thus a drying time of up to 60 seconds at 50° to 80° C is sufficient. Satisfactory drying can typically be achieved by heating at 60° C for 10 to 30 seconds, in comparison with drying cycles involving heating at 60° C for 1 to 3 minutes for assemblies known in the art comprising a gelatin subbing layer applied over one or more polymeric interlayers on a polystyrene film.

The light sensitive emulsion or anti-halation layers applied over the gelatin subbing layer, or alternatively applied direct to the solvent and discharge treated film may be of conventional composition and applied by conventional techniques. Thus the light sensitive emulsion may consist of a silver halide containing gelatin layer.

The coated films of this invention are particularly useful as photobases for graphic arts and also for use in microfilming.

DETAILED DESCRIPTION OF THE INVENTION

The invention is further illustrated by the following examples, A and B being comparative examples and 1 to 7 being examples of the invention.

In the examples the following expressions have the meanings given:

'Dry adhesion' refers to the adhesion of the gelatin silver halide photographic emulsion via the underlying gelatin subbing layer in the final photographic film assembly, assessed, both before and after processing in standard photographic chemicals, by sticking a self adhesive tape along a torn edge of the film and rapidly separating the tape from the film. The adhesion of the emulsion is graded from 1–5, grade 1 being when no emulsion is removed after adhering and removing the adhesive tape eight times and grade 5 being when all the emulsion is removed after one cycle. The final photographic film material is generally only acceptable if the dry adhesion is grade 1.

'Wet adhesion' refers to the adhesion of the gelatin silver halide photographic emulsion via the underlying gelatin subbing layer in the final photographic film material assessed, after processing in standard photographic chemicals and washing in water for 15 minutes, by rubbing with a sponge over a series of lines scored in the still wet emulsion. The adhesion of the emulsion is graded from 1–5, grade 1 being when no emulsion is removed from the edges of the score lines by 10 rubs with the sponge and grade 5 being when all the emulsion is removed between the score lines by 10 rubs. The final photographic film material is only acceptable if the wet adhesion is grade 1.

EXAMPLE A

This example demonstrates the effect of solvent treating a film without corona discharge treatment.

A 100 micron thick biaxially oriented film of styrene homopolymer which is commercially available under the trade name "Polyflex" was roller coated with a solution of 70 parts by volume of acetone and 30 parts by volume of methylene chloride to give a wet coat weight of 100 mg/dm$^2$. The coated film was dried out for one minute at 60° C.

A gelatin subbing layer was applied to the treated film by a roller coating technique from a subbing solution of the following composition:

| Gelatin | 1.4 | g |
|---|---|---|
| Water | 5.0 | ml |
| Glacial acetic acid | 1.0 | g |
| Methanol | 94.0 | ml |
| Formalin | 0.06 | ml |

The gelatin layer was dried for 30 seconds at 60° C to give a dry gelatin subbing coat weight of approximately 2 mg/dm$^2$.

Finally, the gelatin subbing layer was overcoated with a conventional photographic gelatin silver halide emulsion. The assembly was chilled to gel the coating and dried for 20 minutes at 35° C.

Using the procedure described above, the wet and dry adhesion of the coatings was found to be extremely poor, grade 5 in each case.

EXAMPLE B

This example demonstrates the effect of corona discharge treating a film without prior solvent treatment.

A 100 micron thick biaxially oriented film of styrene homopolymer which is commercially available under the trade name "Polyflex" was corona discharge treated by passing the film past discharge electrodes at a linear film speed of 50 ft/minute and spaced 1.5 mm from the electrodes. The power output of the discharge device was 2 kw. and it operated at a potential of 10 kv. The treated film had a wetting test value exceeding 56 dynes/cm when measured by the test specified above.

The treated film was then coated with a gelatin subbing composition and then a gelatin silver halide emulsion as described in Example A.

Using the procedure described above the wet and dry adhesion of the coatings was found to be extremely poor, grade 5 in each case.

EXAMPLE 1

A 100 micron thick biaxially oriented film of styrene homopolymer which is commercially available under the trade name "Polyflex" was treated with the acetone/methylene chloride solvent as described in Example A and then after drying was corona discharge treated as described in Example B.

The treated film was coated with a gelatin subbing composition and then a gelatin silver halide emulsion as described in Example A.

The photographic assembly was tested by the procedure described above for wet and dry adhesion, which was found to be grade 1 before, during and after processing in conventional photographic processing solutions such as highly alkaline developers. No adverse sensitometric effects upon the silver halide emulsion were observed.

EXAMPLE 2

A 100 micron thick biaxially oriented film of styrene homopolymer which is commercially available under the trade name "Polyflex" was treated with acetone/methylene chloride solvent as described in Example A and then after drying was corona discharge treated as described in Example B.

The treated film was then coated directly with a gelatin silver halide emulsion as described in Example A without coating with an intermediate gelatin subbing layer.

The assembly obtained was tested by the procedure described above for wet and dry adhesion. It was found that the adhesion was fairly good, being in the range 1 to 2 before, during and after processing in conventional photographic processing solutions such as highly alkaline developers. No adverse sensitometric effects upon the silver halide emulsion were observed.

EXAMPLE 3

Example 1 was repeated to treat and coat a 100 micron thick biaxially oriented film of a 90% styrene/10% by weight butadiene copolymer which is commercially available under the trade name "Bohips."

The wet and dry adhesion of the coating was grade 1 when tested before, during and after processing in conventional photographic processing solutions such as highly alkaline developers. No adverse sensitometric effects upon the silver halide emulsion were observed.

EXAMPLE 4

Example 2 was repeated to solvent and corona discharge treat a 100 micron thick biaxially oriented film of a 90% styrene/10% by weight butadiene copolymer which is commercially available under the trade name "Bohips," with the exception that the solvent treatment employed a solution of 70 parts by volume acetone and 30 parts by volume methyl ethyl ketone. A gelatin silver halide emulsion was applied directly to one side of the treated film and a conventional anti-halation layer to the other side.

The wet and dry adhesion of both coatings was grade 1 when tested before, during and after processing in conventional photographic processing solutions such as highly alkaline developers. No adverse sensitometric effects upon the silver halide emulsion were observed.

EXAMPLE 5

Example 1 was repeated to treat and coat a 100 micron thick biaxially oriented film of a 95% styrene/5% by weight butadiene copolymer which is commercially available under the trade name "Trycite" with the exception that the solvent employed was 1,1,1-trichloroethane.

The wet and dry adhesion of the coating was grade 1 when tested before, during and after processing in conventional photograhic processing solutions such as highly alkaline developers. No adverse sensitometric effects upon the silver halide emulsion were observed.

EXAMPLE 6

Example 1 was repeated to treat and coat a 100 micron thick biaxially oriented film of a 95% styrene/5% by weight butadiene copolymer which is commercially available under the trade name "Trycite" with the exception that the solvent employed was methyl ethyl ketone.

The wet and dry adhesion of the coating was grade 1 when tested before, during and after processing in conventional photographic processing solutions such as highly alkaline developers. No adverse sensitometric effects upon the silver halide emulsion were observed.

EXAMPLE 7

Example 1 was repeated to treat and coat a 100 micron thick biaxially oriented film of a 95% styrene/5% by weight butadiene copolymer which is commercially available under the trade name "Trycite."

The wet and dry adhesion of the coating was grade 1 when tested before, during and after processing in conventional photographic processing solutions such as highly alkaline developers. No adverse sensitometric effects upon the silver halide emulsion were observed.

We claim:

1. A process for producing a light transmitting coated synthetic film material, which comprises pretreating the surface of a styrene homopolymer or copolymer film and coating said surface with a gelatin-containing layer, the pretreating step consisting of treating the film surface with a solvent for the film without whitening so as to make said film surface porous to said gelatin-containing layer thereby enabling said gelatin-containing layer to penetrate into said film to a greater depth than when said film is not treated with a solvent, drying the solvent, and subsequently corona discharge treating the solvent treated surface.

2. A process according to claim 1, in which the film is a copolymer of styrene with butadiene and/or acrylonitrile.

3. A process according to claim 2, in which the film is a copolymer of 95% by weight styrene and 5% by weight butadiene.

4. A process according to claim 1, in which the solvent is methyl ethyl ketone; toluene; 1,1,1-trichloroethane; acetone; methylene chloride; methyl acetate and/or ethyl acetate.

5. A process according to claim 1, in which a wet coat weight of about 100 mg/dm$^2$ of solvent is applied to the film surface.

6. A process according to claim 1, in which contact between the film surface and the solvent is maintained for 0.5 to 4.0 seconds.

7. A process according to claim 1, in which the gelatin layer is a subbing layer and is dried for up to 60 seconds at 50° to 80° C.

8. A process according to claim 7, in which the gelatin subbing layer is dried at 60° C for 10 to 30 seconds.

9. A process according to claim 1, in which a light sensitive emulsion layer and/or an anti-halation layer is applied to the gelatin subbing layer.

10. A light transmitting coated synthetic film produced according to the process of claim 1.

* * * * *